Figure 1:
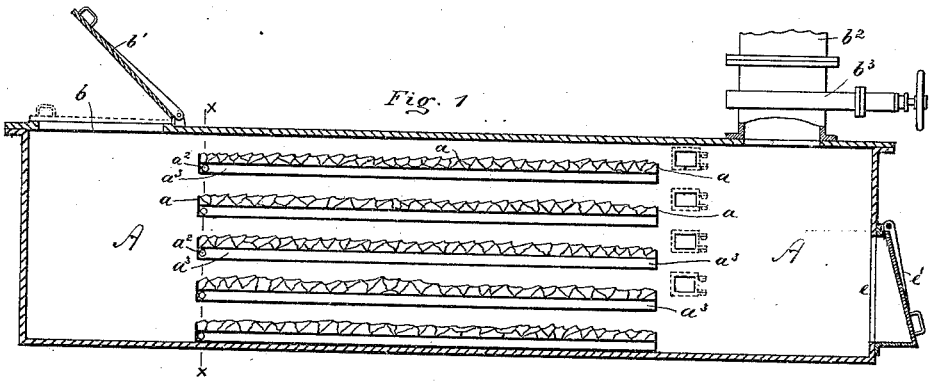

(No Model.) 2 Sheets—Sheet 1.

J. H. CREMER.
PROCESS OF DRYING AIR FOR METALLURGIC OPERATIONS.

No. 330,381. Patented Nov. 17, 1885.

Witnesses:
L. Holmbo
Inventor
John H. Cremer
by Prince Asher
Attorneys.

(No Model.)
J. H. CREMER.
PROCESS OF DRYING AIR FOR METALLURGIC OPERATIONS.
No. 330,381. Patented Nov. 17, 1885.
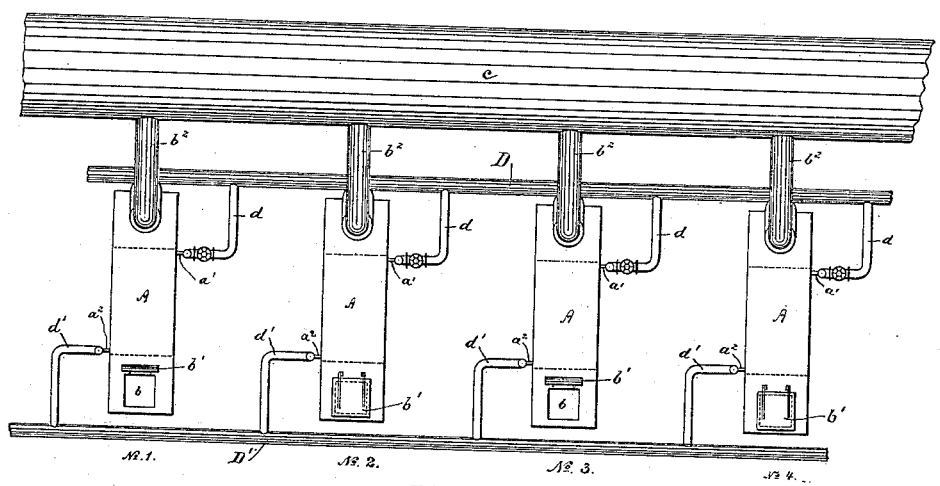
Fig. 5.
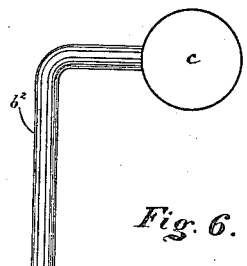
Fig. 6.
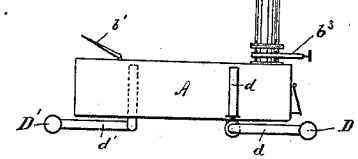
Witnesses:
Inventor

UNITED STATES PATENT OFFICE.

JOHN H. CREMER, OF BRADDOCKS, PENNSYLVANIA.

PROCESS OF DRYING AIR FOR METALLURGIC OPERATIONS.

SPECIFICATION forming part of Letters Patent No. 330,381, dated November 17, 1885.

Application filed January 17, 1885. Serial No. 153,219. (No model.)

*To all whom it may concern:*

Be it known that I, JOHN H. CREMER, a subject of the King of Holland, residing at Braddocks, in the county of Allegheny, State of Pennsylvania, have invented certain new and useful Improvements in Process of Drying Air for Metallurgic Operations; and I do hereby declare the following to be a full, clear, and exact description of the invention, sufficient to enable others skilled in the art to make and use the same.

Atmospheric air contains more or less watery vapor in suspension, the quantity thereof varying from about 0.25 to over one per cent. The presence of watery vapor is oftentimes a serious detriment in many industrial operations, involving the use of atmospheric air, and noticeably is this true in the working of smelting or blast furnaces for the reduction of iron from its ores. The water, coming in contact with the highly-heated coal, coke, iron, or other metal, is immediately decomposed, absorbing from the fuel a large quantity of heat, and also oxidizing the metals. Such disturbing reactions give rise to annoying perturbations in the working of the blast-furnace, developing a high heat in the stack, making the charge to "scaffold," and otherwise affecting the even reduction of the metal. When the product of the furnace is run directly therefrom, and is used in molten condition to charge the Bessemer converter, it is necessary that within definite limits the percentage composition of the furnace product be carefully maintained. But such uniformity in condition, always difficult to accomplish, is rendered much more so by reason of the variable and uncertain quantity of watery vapor coming into the furnace with the air-blast and developing therein the disturbing influences heretofore detailed. Hence it is the object of my invention to eliminate this source of error by depriving the air-blast practically of its contained moisture; and while I shall describe my invention hereinafter with particular reference to its use in connection with the blast-furnaces, it will be understood that the benefits thereof are not restricted to such special application, but that said invention may also be adapted to other purposes—as, for instance, in conjunction with cupola-furnaces, Bessemer converters, &c., where it is desired to deprive the air-blast of its moisture.

My invention consists in the method or process of operating smelting or like furnaces continuously by means of a dry-air blast, the furnace air-supply being alternately exposed to separate portions of desiccating materials to abstract the moisture therefrom, while the separate portions of waste desiccants are alternately revivified or restored to working condition *in situ.*

In the practice of the invention the blast or like furnace is provided with one or more desiccating or drying chambers, through which the air-supply passes, and wherein it is deprived of its contained moisture prior to the entry of the air into the furnace. The desiccating-chambers are arranged on the regenerative plan, by which means one or more of said chambers may be in active use while the waste desiccants in the other chamber or chambers are being restored *in situ* to proper working condition. It must be understood, however, that the apparatus presently to be described and the details thereof form no part of this particular application, which is restricted to the method or process of operating the furnace as heretofore defined.

Although the construction of the apparatus and its mode of operation are properly set forth, in order to furnish those skilled in the art with the requisite information as to the best known way for practicing the process invention, such mechanical features are not claimed herein, but are necessarily reserved to constitute the subject-matter of a separate application.

Figure 2:
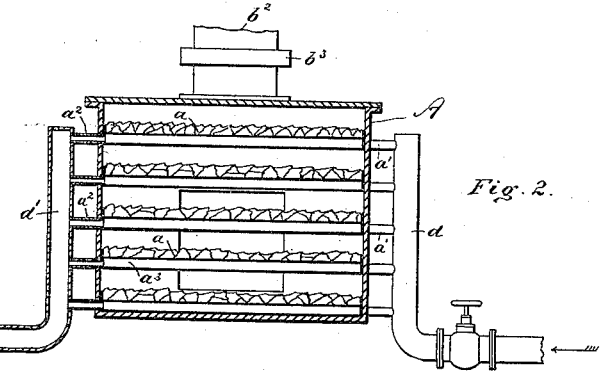
Figure 3:
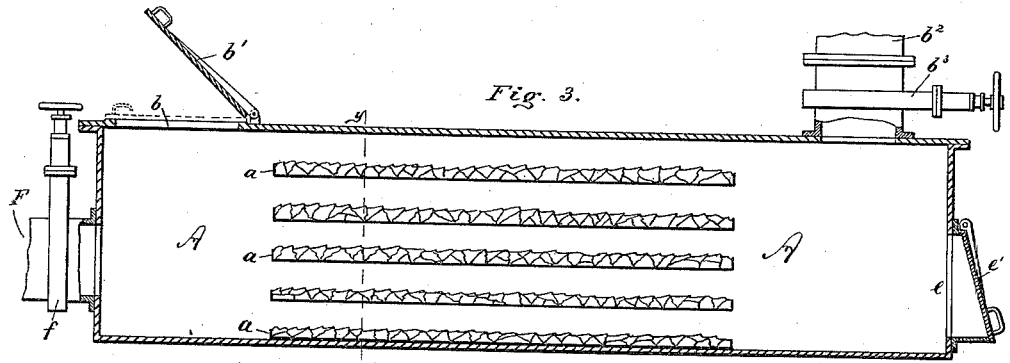
Figure 4:
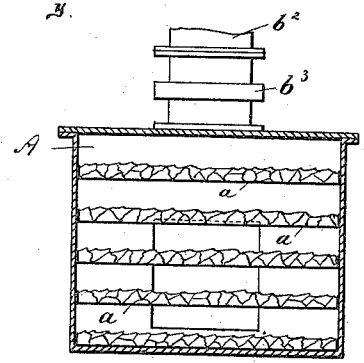

In the accompanying drawings, forming part of this specification, Figure 1 is a longitudinal section, and Fig. 2 a transverse section view, of one of the desiccating-chambers. Figs. 3 and 4 are like views respectively of a modified form of the same. Fig. 5 is a plan view of a series of the desiccating-chambers and adjuncts, Figs. 1 and 2, in connection with the air trunk or main; Fig. 6 an end elevation of one of the chambers and of the air-main.

The desiccating-chamber A, conveniently of rectangular form, may consist, preferably, of sheet-metal plates stoutly secured together to constitute a closed compartment, said compartment serving to contain the materials for abstracting the moisture from the air-current. This material may be concentrated sulphuric acid, calcic chloride, or such like substances possessing the desired property of absorbing moisture, although in practice the calcic chloride is deemed best suited for the purpose.

The exposed surfaces of the chamber and the pans, trays, or grids for holding the drying material may be coated or lined, if necessary, to prevent corrosive action.

In using the chloride of calcium it is proposed to arrange a series of trays, $a$, one above the other, and extending across the chamber A, as shown, with suitable space between the trays to allow conveniently for charging the materials thereon, and also for the free sweep of the air-currents over the same. The trays may be of any suitable size or capacity, dependent upon the volume and velocity of the passing current, and can be sustained in position by any convenient or well-known means. The inlet-port $b$, closed by door or valve, as at $b'$, admits the air-supply to chamber A, while an outlet-pipe, $b^2$, provided with suitable shut-off valve, $b^3$, serves to conduct the air therefrom into the trunk or main $c$, Figs. 5 and 6, with which trunk the blower or blowing-engine is connected. It is obvious that in some instances the inlet-port $b$, instead of opening directly from the air, as shown, may be connected by flue similar to pipe $b^2$ with the exit of the blower or blowing-engine. In such event the air would be forced into instead of being drawn through the chamber A, while the trunk or main $c$, receiving the desiccated air, would deliver the same directly to the oven or regenerator; or, if no heating of the air is practiced, then directly to the furnace. Whichever plan be adopted, the air passing through the chamber A in direct contact with the surface of the desiccating material has substantially all of its moisture abstracted, so that the deleterious effects due to the presence of such moisture are no longer experienced. After more or less exposure the calcium chloride becomes saturated and sluggish in its action, so that it is necessary to renew or revivify the same. This regeneration of the desiccating material may be accomplished efficiently and quickly $in\ situ$ by either one of the following means: In Figs. 1 and 2 the trays $a$ are shown to have a hollow shell or jacket, $a^3$, extending beneath the bottom, into which, conveniently at opposite diagonal ends, open the inlets $a'$ and outlets $a^2$ of the supply-pipes $d$ and discharge-pipes $d'$, respectively. Hot air from the ovens or hot furnace gases or steam may be delivered by main pipes D to the several supply-pipes $d$, and thence to the jackets $a^3$, imparting heat to the calcium chloride on trays $a$, and driving off the absorbed moisture. The waste air, gases, or steam pass from the jackets $a^3$ by exits $d'$ and pipes D' to any convenient point. During the period of regeneration it will be understood that the valve $b^3$ in pipe $b^2$ is closed, so that the desiccating-chamber is practically out of service. To provide for such contingency, it is seen from Fig. 5 that there is a series of separate chambers, A, communicating with the trunk $c$, any one or more of which may be used as desired in desiccating the air-supply while the others are shut off either for regeneration or repairs. Thus chambers numbers 1 and 3 may be working while numbers 2 and 4 are being revivified, and vice versa. The valve $b'$ and the man-hole $e$ in chamber A may be opened during regeneration to admit of a local air circulation sufficient to carry away the vapor which is thrown off from the saturated desiccating material.

In Figs. 3 and 4 the regeneration of the inert desiccating materials is shown to be effected not by the use of jackets beneath the trays $a$, as in Figs. 1 and 2, but by means of the direct contact of hot air or waste furnace-gases blasted into chamber A from the main F, and passing therefrom by the man-hole $e$. Valve $f$ and lid $e'$ close the main F and the man-hole, respectively, during the time that the chamber is working in the desiccation of the air.

By either of the expedients heretofore set forth, or like suitable means, it becomes possible to revivify the desiccating material $in\ situ$, and, as appears, to do this economically by utilization of the waste furnace-gases either mediately or immediately and in such manner as not to interfere with the regular and continuous working of the furnace. A single charge of desiccating material may obviously serve by careful management for a long period of use.

Other forms of drying-chamber may be adopted than are set out herein without departing from the spirit of my process. Thus the calcium chloride might be molded into brick form with use of a little clay and coal-dust to give consistency, the dried bricks being arranged in an upright chamber exactly as in a Whitwell hot-air stove, a layer of common brick sustained from the side walls being arched at regular stages to sustain the rows of desiccating brick next above. The regeneration of such type of drying-chamber would proceed exactly as now occurs in the Whitwell regenerative stove—that is, one compartment would be desiccating the air-supply, and at the same time the other compartment, under the high heat of the waste-furnace gases circulating therein, would be parting with the excess moisture. Whatever construction be adopted, so long as the desiccating-chambers are used alternatively and regeneratively the working of the furnace continues uninterruptedly and the benefits of my invention are to be derived.

The use of desiccants in drying glue-stock, &c., is well known, and it has also been proposed to employ the same in drying the air-supply for roasting-hearths and smelting-furnaces; but in this last-named use the desiccant, instead of being disposed in separate chambers, so as to be regenerated *in situ* without arresting the continuous operation of the furnace, was retained in bulk; hence no regeneration was attempted or was practicable. The desiccant wasted away to solution, and the air, surcharged with moisture from the deliquescent material, speedily and wastefully impaired the fresh supply.

I am not aware that prior to my invention any plan has been devised whereby the same desiccants could be frequently revivified and reused *in situ* without handling and without the expense of fresh charges at the same time that the working of the furnace with dried air continued uninterruptedly.

Without limiting myself to the precise details of structure hereinbefore detailed, and having thus described the invention, what I claim as new, and desire to secure by Letters Patent, is—

1. The method of drying air continuously for use in smelting-furnaces or the like, which consists in exposing the air-supply alternately to separate portions of desiccating materials to abstract the moisture therefrom and alternately revivifying the separate portions of waste desiccants *in situ*, substantially as described.

2. The method of operating smelting and like furnaces continuously by means of a dry-air blast, which consists in exposing the furnace air-supply alternately to separate portions of desiccating materials to abstract the moisture therefrom and alternately revivifying the separate portions of waste desiccants *in situ*, substantially as described.

JOHN H. CREMER.

Witnesses:
 RICHARD STEVENS,
 JOHN F. MOKATE.